United States Patent
He et al.

(10) Patent No.: US 11,544,803 B2
(45) Date of Patent: Jan. 3, 2023

(54) METHOD AND DEVICE FOR CONTROLLING PORTABLE ENERGY STORAGE SYSTEM

(71) Applicant: Tsinghua University, Beijing (CN)

(72) Inventors: Guannan He, Beijing (CN); Qixin Chen, Beijing (CN); Da Zhang, Beijing (CN); Jay Whitacre, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/490,679

(22) Filed: Sep. 30, 2021

(65) Prior Publication Data

US 2022/0366516 A1   Nov. 17, 2022

(30) Foreign Application Priority Data

May 6, 2021 (CN) .......................... 202110492312.9

(51) Int. Cl.
*G06Q 50/06* (2012.01)
*G06Q 10/04* (2012.01)
*B60L 50/90* (2019.01)

(52) U.S. Cl.
CPC .............. *G06Q 50/06* (2013.01); *B60L 50/90* (2019.02); *G06Q 10/04* (2013.01)

(58) Field of Classification Search
CPC ......... G06Q 50/06; G06Q 10/04; B60L 50/90
USPC .......................................................... 701/22
See application file for complete search history.

(56) References Cited

U.S. PATENT DOCUMENTS

| | | | |
|---|---|---|---|
| 2002/0107618 A1* | 8/2002 | Deguchi | B60W 10/08 180/65.23 |
| 2009/0150016 A1* | 6/2009 | Hung | B60W 10/06 903/905 |
| 2009/0259355 A1* | 10/2009 | Li | G01C 21/26 903/930 |
| 2011/0022255 A1* | 1/2011 | Yamada | B60K 6/46 180/65.265 |
| 2011/0066310 A1* | 3/2011 | Sakai | B60L 7/16 701/22 |
| 2011/0264317 A1* | 10/2011 | Druenert | B60W 20/11 701/22 |

(Continued)

OTHER PUBLICATIONS

"Optimization models for placement of an energy-aware electric vehicle charging infrastructure" Published by Elsevier (Year: 2016).*

*Primary Examiner* — Zeina Elchanti
(74) *Attorney, Agent, or Firm* — Hodgson Russ LLP

(57) ABSTRACT

A method for controlling a portable energy storage system (PESS) includes: creating a decision optimization model for the PESS, which includes an objective function for maximizing available compensation of the PESS in the region to be applied; solving the decision optimization model to obtain a feasible solution that meets the objective function; and determining at least one of an energy charging and discharging decision, a travel decision, and an energy storage unit loading decision of the PESS in a region to be applied based on the feasible solution, and controlling operations of the PESS in the region to be applied based on at least one of the determined energy charging and discharging decision, the determined travel decision and the determined energy storage unit loading decision.

20 Claims, 3 Drawing Sheets

(56) References Cited

U.S. PATENT DOCUMENTS

| | | | |
|---|---|---|---|
| 2012/0010767 A1* | 1/2012 | Phillips | B60W 50/0097 180/65.21 |
| 2012/0010768 A1* | 1/2012 | Phillips | B60L 50/16 180/65.21 |
| 2012/0035795 A1* | 2/2012 | Yu | B60W 50/0097 180/65.265 |
| 2012/0109515 A1* | 5/2012 | Uyeki | G01C 21/3469 701/423 |
| 2012/0209462 A1* | 8/2012 | Roos | B60L 58/15 475/5 |
| 2012/0310471 A1* | 12/2012 | Sengoku | B60L 50/16 701/31.5 |
| 2013/0002188 A1* | 1/2013 | Uyeki | B60L 53/305 320/109 |
| 2019/0248243 A1* | 8/2019 | Gaither | B60L 8/003 |
| 2020/0124432 A1* | 4/2020 | Heap | G05D 1/0217 |
| 2022/0205796 A1* | 6/2022 | Wray | G01C 21/3492 |

* cited by examiner

METHOD AND DEVICE FOR CONTROLLING PORTABLE ENERGY STORAGE SYSTEM

CROSS-REFERENCE TO RELATED APPLICATION

This application claims priority to Chinese Patent Application No. 202110492312.9, filed on May 6, 2021, the entire contents of which is incorporated by reference herein.

FIELD

The disclosure relates to the technical field of management and operation of energy storage systems, and more particularly to a method and a device for controlling a portable energy storage system (PESS), and a computer readable storage medium.

BACKGROUND

With the popularization of low-carbon concepts, innovative energy technologies have been developed in various fields. For example, the whole world is advocating and encouraging the use of electric vehicles as a means of transportation, and arranging energy storage devices for power systems, thereby forming a complex storage device combination that integrates power and transportation systems.

SUMMARY

According to a first aspect of the disclosure, a method for controlling a PESS includes: creating a decision optimization model for the PESS, in which the decision optimization model is related to at least one of an energy charging and discharging decision, a travel decision, and an energy storage unit loading decision of the PESS in a region to be applied, and the decision optimization model includes an objective function for maximizing available compensation of the PESS in the region to be applied; solving the decision optimization model to obtain a feasible solution that meets the objective function; and determining at least one of the energy charging and discharging decision, the travel decision, and the energy storage unit loading decision of the PESS in the region to be applied based on the feasible solution, and controlling operations of the PESS in the region to be applied based on at least one of the determined energy charging and discharging decision, the determined travel decision and the determined energy storage unit loading decision.

According to a second aspect of the disclosure, a device for controlling a PESS includes a processor and a memory configured to store instructions executable by the processor. When the instructions are executed by the processor, the processor is caused to implement the method for controlling a PESS according to the first aspect of the present disclosure.

According to a third aspect of the disclosure, a non-transitory computer-readable storage medium having computer programs stored thereon. When the computer program in the storage medium are executed by the computer, the computer is caused to implement the method for controlling a PESS according to the first aspect of the present disclosure.

The additional aspects and advantages of the present disclosure will be partially given in the following description, and some will become obvious from the following description, or be understood through the practice of the present disclosure.

BRIEF DESCRIPTION OF THE DRAWINGS

The above and/or additional aspects and advantages of the present disclosure will become obvious and easy to understand from the following description of the embodiments in conjunction with the accompanying drawings, in which.

DETAILED DESCRIPTION

Figure 1:
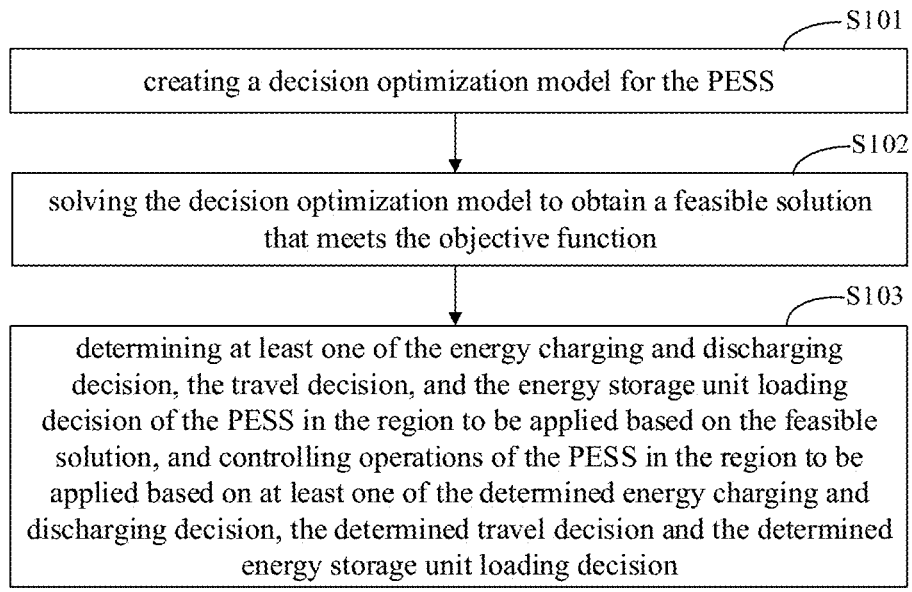
FIG. 1 illustrates a flowchart of a method for controlling a PESS according to an embodiment of the present disclosure.

In order to make those skilled in the art to better understand the technical solution of the present invention, a method and an apparatus for controlling a PESS, and a computer readable storage medium according to the present invention will be described in detail below with reference to the accompanying drawings.

Hereinafter, exemplary embodiments will be described more fully with reference to the accompanying drawings, but the exemplary embodiments may be embodied in different forms and should not be construed as being limited to the embodiments set forth herein. On the contrary, the purpose of providing these embodiments is to make the present disclosure thorough and complete, and to make those skilled in the art to fully understand the scope of the present disclosure.

As used herein, the term "and/or" includes any and all combinations of one or more of the related listed items.

The terms used herein are only used to describe specific embodiments and are not intended to limit the present disclosure. As used herein, the singular forms "a" and "the" are also intended to include the plural forms, unless the context clearly dictates otherwise. It will also be understood that when the terms "comprising" and/or "made of" are used in the specification, they specify the presence of the features, integers, steps, operations, elements and/or components as described, but do not exclude the presence or addition of one or more other features, integers, steps, operations, elements, components, and/or groups thereof.

Unless otherwise defined, all terms (including technical and scientific terms) used herein have the same meanings as commonly understood by those skilled in the art. It will also be understood that terms such as those defined in commonly used dictionaries should be interpreted as having meanings consistent with their meanings in the related art and the context of the present disclosure, and will not be interpreted as having idealized or excessive formal meanings, unless clearly defined herein.

At present, a portable energy storage system (PESS) has been proposed, which has obvious advantages over a fixed energy storage system and provides a more flexible way for integration, utilization, and circulation of the energy storage devices. The PESS usually includes a vehicle body, an energy storage device, a thermal management system and a power conversion system. An energy storage device, an inverter, and other support systems are carried in the vehicle body, which moves between multiple locations with different benefit opportunities. There is an urgent need to solve how to control the PESS to move between the clogged nodes, thereby effectively charging and discharging and further alleviating the congestion.

The present disclosure relates to the management and operation of energy storage systems, and more particularly to an operation decision method and apparatus for determining a travel scheme, an energy charging and discharging scheme, and an energy storage unit loading scheme of the PESS.

Currently, in order to achieve an economical and reliable transition to a low-carbon future, innovative energy technologies are applied in various fields. For example, the whole world is advocating and encouraging the use of electric vehicles as a means of transportation, and arranging energy storage devices for power systems, thereby forming a complex storage device combination that integrates power and transportation systems. Such trend has brought new challenges to the formulation of decision schemes such as planning, coordinating, inquiring, and controlling for energy systems and other combined systems.

In the power system, power network congestion has become a major concern. In addition to the expansion of transmission capacity, the energy storage device also provides other feasible solutions to the congestion problem. The ability of the energy storage device alleviating the congestion is limited to its capacity. When the energy storage device is full or empty after one cycle, it can no longer contribute to alleviating the congestion. However, if the energy storage device is portable and may be transported between the clogged nodes, the energy storage device may be used for multiple times a day. For example, it repeatedly stores energy at one node and discharges energy at another node. Therefore, the same size of a portable energy storage device may make a greater contribution to alleviating the congestion than a fixed energy storage device. Even when the two clogged nodes are very close geographically, the portable energy storage device has advantages over the fixed energy storage device since the travel distance may be very short. However, there has been no in-depth research on the transportation of large-scale energy storage devices for power network applications so far.

In a more general context, the portable energy storage system (PESS) has obvious advantages over the fixed energy storage system and provides a more flexible way for integration, utilization and circulation of the energy storage devices.

In the disclosure, a decision model for a large-scale PESS is proposed. The PESS usually includes a vehicle body, an energy storage device, a thermal management system, a power conversion system and so on. An energy storage device, an inverter and other support systems are carried in the vehicle body, which moves between multiple locations with different benefit opportunities. A decision optimization model is created to determine an optimal operation scheme of the PESS.

According to an aspect of the present disclosure, an embodiment of the present disclosure provides a method for controlling a PESS. Referring to FIG. 1, it illustrates a flowchart of a method for controlling a PESS according to an embodiment of the present disclosure. As illustrated in FIG. 1, the method for controlling a PESS includes the following blocks.

At block S101, a decision optimization model is created for the PESS. The decision optimization model is related to at least one of an energy charging and discharging decision, a travel decision, and an energy storage unit loading decision of the PESS in a region to be applied. The decision optimization model includes an objective function for maximizing available compensation of the PESS in the region to be applied.

In the embodiment, a set of applications/services or a price stream of the PESS may be selected or specified. Based on the selected or specified set of applications/services or price stream, the decision involved in the set of applications/services or price stream of the PESS may be selected from the energy charging and discharging decision, the travel decision, and the energy storage unit loading decision. In addition, operation constraints of the PESS are specified according to a current state of the PESS and the set of applications/services or price stream of the PESS, such as power constraints, energy constraints, aging constraints, and so on. The decision optimization model related to the selected decision is created based on the involved decision and the specified operation constraints. That is to say, the decision optimization model related to the set of applications/services or price stream of the PESS may be created in the disclosure based on the decision involved in the set of applications/services or price stream of the PESS and the specified operation constraints. Generally, a decision application duration is in days. The decision is rolled in time for online/dynamic control, which utilizes updated states and predictive information of each energy storage device in the PESS.

In some embodiments, a decision optimization model related to the energy charging and discharging decision and the travel decision may be created. In other embodiments, a decision optimization model related to the energy charging and discharging decision, the travel decision, and the energy storage unit loading decision may be created. The energy charging and discharging decision is configured to determine when to store/discharge energy from/to the nodes in the region to be applied and how much energy is stored/discharged. The travel decision is configured to determine to which node the PESS travels from one node in the region to be applied and when to travel. The energy storage unit loading decision is configured to determine when to load/unload energy storage units and how many energy storage units are load/unload for the PESS.

In the disclosure, the decision optimization model is generally a mixed integer linear programming. In some embodiments, the decision optimization model has an objective function with an object of maximizing the available compensation of the PESS in the region to be applied. The objective function depends on compensation related to energy charging and discharging obtained by the PESS in the region to be applied through the energy charging and discharging, a transportation loss caused when the PESS is operated to move between different nodes in the region to be applied and an aging loss caused by energy use of the PESS. In other words, the object of the decision optimization model is to maximize total compensation ($R_t$) of the PESS in a specific region minus the transportation loss ($C_t^{tr}$) and the aging loss ($C_t^d$) of the PESS. The objective function may be thus expressed as:

$$\max_{P_{n,h}^{dis}, P_{n,h}^{cha}, \gamma_{n,n',h}} Y_t = \max_{P_{n,h}^{dis}, P_{n,h}^{cha}, \gamma_{n,n',h}} \left(R_t - C_t^{tr} - C_t^d\right) \quad (1)$$

where n and n' represent a node index, h represents a time index, $Y_t$ represents available compensation of the PESS in the region to be applied, $R_t$ represents total compensation related to the energy charging and discharging, $C_t^{tr}$ represents transportation loss, Cd represents aging loss, $P_{n,h}^{dis}$ represents the energy discharging of the PESS at the node n and the time h $P_{n,h}^{cha}$ represents the energy charging of the PESS at the node n and the time h, and $\gamma_{n,n',h}$ represents whether the PESS moves from the node n to the node n' at the time h.

In some cases, since the aging loss is not the actual cost but the opportunity cost. In this case, the aging loss should be added to the objective function for calculating $Y_t^* + C_t^{d*}$, which may represent the total economic compensation actually produced.

In some embodiments, the compensation related to the energy charging and discharging may be expressed as:

$$R_t = \sum_{h \in [t, t+\Delta t]} \sum_{n \in \Omega_n} \left[\lambda_{n,h}\left(P_{n,h}^{dis} - P_{n,h}^{cha}\right)\Delta h\right] \quad (2)$$

where $\Delta h$ represents a dispatch time scale, t represents a date index, $\Delta t$ represents a decision application duration, $\lambda_{n,h}$ represents a locational marginal price at the node n and the time h, and $\Omega_n$ represents a set of nodes to which the PESS will be shared.

The transportation loss mainly involves in labor costs, which are assumed to be proportional to a total travel time per unit time. In some embodiments, the transportation loss may be expressed as:

$$C_t^{tr} = c_{tr} \sum_{h \in [t, t+\Delta t]} \gamma_{n,n',h} \Delta h \quad (3)$$

where $\Delta h$ represents a dispatch time scale, t represents a date index, $\Delta t$ represents a decision application duration, and $c_{tr}$ represents a transportation loss per unit time.

The aging loss is the opportunity cost where the use of current energy storage device may lead to a loss of future benefit opportunities. Therefore, the aging loss may be divided into two categories: a) cyclic aging, which mainly depends on the energy amount in the entire process where the storage device is processed, that is, the cyclic aging of each energy storage device may be a function of past power output of the energy storage device, which may be expressed by the first part $c_t^d$ of the following equation (4); b) calendar aging, which mainly depends on states of charge (SOC), temperatures and durations experienced by the storage device. It is assumed that the average SOC and temperature are constant, the calendar aging during a certain period of time may be regarded as constant, which may be indicated by $q_t$ in the following equation (4).

$$C_t^d = c_t^d \left[\sum_{h \in [t, t+\Delta t]} \left(P_{n,h}^{dis} + P_{n,h}^{cha}\right)\Delta h + q_t\right] \quad (4)$$

where $\Delta h$ represents a dispatch time scale, t represents a date index, $\Delta t$ represents a decision application duration, $c_t^d$ represents the aging loss per unit time, and $q_t$ represents the calendar aging at the time t. The aging loss per unit time is called the marginal cost for use, which may be determined by a future benefit rate through life cycle operation simulation. Generally, the higher the possible future benefit, the greater the marginal cost for use.

In some embodiments, the operation constraints of the PESS specified according to the current state of the PESS and the set of applications/services or price stream of the PESS may include energy constraints for an energy capacity of the PESS, power output constraints for an power capacity of the PESS, and travel time constraints for an operating time of the PESS.

In some embodiments, the energy constraints may be expressed as:

$$E_h = (1-\rho)E_{h-1} + \sum_{n \in \Omega_n} \left(P_{n,h}^{cha}\eta_t\Delta h - P_{n,h}^{dis}\Delta h/\eta_t\right) \quad \forall h \in [t, t+\Delta t] \quad (5)$$

$$0 \le E_h \le E_t^{max} \quad \forall h \in [t, t+\Delta t] \quad (6)$$

where n represents a node index, h represents a time index, $\Delta h$ represents a dispatch time scale, t represents a date index, $\Delta t$ represents a decision application duration, $P_{n,h}^{dis}$ represents the energy discharging of the PESS at the node n and the time h, $P_{n,h}^{cha}$ represents the energy charging of the PESS at the node n and the time h, $\rho_t$ represents an energy charging and discharging efficiency of the PESS at t, p represents a self-discharge rate of the PESS, $E_h$ represents an energy level of the PESS at the time h, $E_{h-1}$ represents an energy level of the PESS at the time h−1, and $E_t^{max}$ represents an energy capacity of the PESS.

The energy charging and discharging efficiency of each energy storage device in the PESS depends on the state of charge and the power output.

In some embodiments, the power output constraints may be expressed as:

$$0 \le P_{n,h}^{dis}, P_{n,h}^{cha} \le \omega_{n,h} \cdot P_t^{max} \quad \forall n \in \Omega_n, h \in [t, t+\Delta t] \quad (7)$$

$$\sum_{n \in \Omega_n} \omega_{n,h} \le 1 - \sum_{n \in \Omega_n} \sum_{n' \in \Omega_n} \gamma_{n,n',h} \quad \forall h \in [t, t+\Delta t] \quad (8)$$

$$\alpha_{n,h} - \beta_{n,h} = \omega_{n,h} - \omega_{n,h-1} \quad \forall n \in \Omega_n, h \in [t, t+\Delta t] \quad (9)$$

$$\sum_{n \in \Omega_n} (\alpha_{n,h} + \beta_{n,h}) \le 1 \quad \forall h \in [t, t+\Delta t] \quad (10)$$

$$\sum_{n' \in \Omega_n} \gamma_{n,n',h} \ge \beta_{n,h} \quad \forall n \in \Omega_n, h \in [t, t+\Delta t] \quad (11)$$

$$\alpha_{n',h} - \theta_{n',h} = \sum_{n \in \Omega_n} \left(\gamma_{n,n',h-1} - \gamma_{n,n',h}\right) \quad \forall n' \in \Omega_n, h \in [t, t+\Delta t] \quad (12)$$

$$\sum_{n \in \Omega_n} (\alpha_{n,h} + \theta_{n,h}) \le 1 \quad \forall h \in [t, t+\Delta t] \quad (13)$$

where n represents a node index, h represents a time index, t represents a date index, $\Delta t$ represents a decision application duration, $\Omega_n$ represents a set of nodes that the PESS will be shared, $P_{n,h}^{dis}$ represents the energy discharging of the PESS at the node n and the time h, $P_{n,h}^{cha}$ represents the energy charging of the PESS at the node n and the time h, $\omega_{n,h}$ represents whether the PESS is located in the node n at the time h, $P_t^{max}$ represents a power capacity of the PESS, $\gamma_{n,n',h}$ represents whether the PESS moves from the node n to the node n' at the time h, $\alpha_{n,h}$ represents whether the PESS moves to the node n at the time h, $\beta_{n,h}$ represents whether the PESS moves away from the node n at the time h, $\omega_{n,h-1}$ represents whether the PESS is located in the node n at the time h−1, $\alpha_{n',h}$ represents whether the PESS moves to the node n' at the time h, $\gamma_{n,n',h-1}$ represents whether the PESS moves from the node n to the node n' at the time h−1, $\theta_{n,h}$ and $\theta_{n',h}$ represent auxiliary variables.

The above equation (8) indicates that the storage device only exists in one node at a time point. The above equations (9)-(13) are the modeling of a travel state of the storage device.

In some embodiments, the travel time constraints may be expressed as:

$$\gamma_{n,n',h} \geq \gamma_{n,n',h-1} - \gamma_{n,n',h-T_{n,n',h}} \quad \forall n \in \Omega_n, n' \in \Omega_n, h \in [t, t+\Delta t] \quad (14)$$

where n and n' represents a node index, h represents a time index, t represents a date index, $\Delta t$ represents a decision application duration, $\Omega_n$ represents a set of nodes that the PESS will be shared, $\gamma_{n,n',h}$ represents whether the PESS is moved from the node n to the node n' at the time h, and $\gamma_{n,n',h-1}$ represents whether the PESS is moved from the node n to the node n' at the time h−1, $T_{n,n',h}$ represents the duration required by the PESS ready to operate away from the node n to the node n' at the time h, which may change over time due to traffic jams.

At block S102, the decision optimization model is solved to obtain a feasible solution that meets the objective function.

In the embodiment, the decision optimization model is solved by collecting required information, such as hourly forecast of electricity market prices, and/or any other information required for estimating the expected benefit when the PESS stores or discharges per power or when the PESS loads or unloads per energy storage device, and/or travel time information depending on the local traffic, etc.

The decision optimization model is solved by taking the collected information as inputs.

At block S103, at least one of the energy charging and discharging decision, the travel decision, and the energy storage unit loading decision of the PESS in the region to be applied is determined based on the feasible solution, and operations of the PESS in the region to be applied are controlled based on at least one of the determined energy charging and discharging decision, the determined travel decision and the determined energy storage unit loading decision;

At least one of the energy charging and discharging decision, the travel decision, and the energy storage unit loading decision of the PESS is determined based on the feasible solution obtained by solving the decision optimization model, and the operations of the PESS in the region to be applied are controlled based on the determined decision, so as to realize the maximum benefit of the PESS in the region to be applied.

Figure 2:
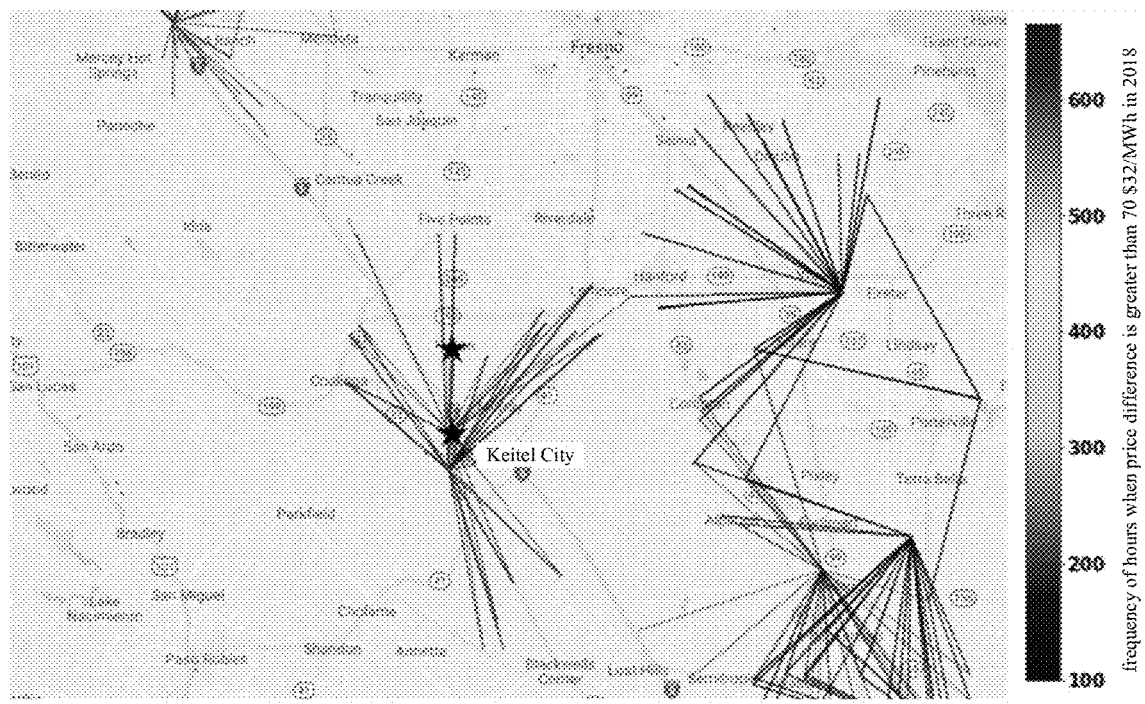
FIG. 2 illustrates a schematic diagram of a set of sample nodes during which the PESS may perform operations.

In order to clearly introduce the beneficial effects of the disclosure, the decision optimization model according to the disclosure is applied to a dispatch of the PESS using the Tesla Power Group that performs operations between two nodes near Keitel City in the California power system. As illustrated in FIG. 2, the two nodes are shown in stars.

The driving distance between the two nodes is approximately 16 miles, and the estimated average travel time is approximately 19 minutes. The optimal marginal cost for use of portable storage devices is $32/MWh. In 2018, the operation and transportation strategy of the vehicle body was optimized for the PESS every day. The dispatch time scale $\Delta h$ is set to be 15 minutes. The storage device is rated at 2.7 MW, i.e., 2.7 MWh per vehicle body. It is assumed that the storage device is a price-taker (i.e., the output of the storage device has no effect on the price at the node). The historical locational marginal price (LMP) is adopted as the price forecast. The energy storage/discharge efficiency is assumed to be 95%, which represents a round-trip efficiency of 90%. The self-discharge rate is assumed to be zero. Considering a driver for the vehicle body with an hourly salary of $20, the labor cost is $5 per 15 minutes. The energy cost is very small compared to the labor cost, so it may be ignored. Energy storage device utilization and aging are measured by the energy throughput, with a unit of MWh herein. The service life of a lithium-ion battery is assumed to be 3000 cycles, which is equivalent to 1.62 billion Wh. The calendar aging rate is assumed to be 1% capacity loss/year, which is equivalent to approximately 1.5 MWh of energy throughput per day (assuming that the life of the storage device ends when the capacity is reduced to 70% of the original capacity). The discount rate is set to be 7%. Travel time data may be obtained from any map service.

Figure 3:
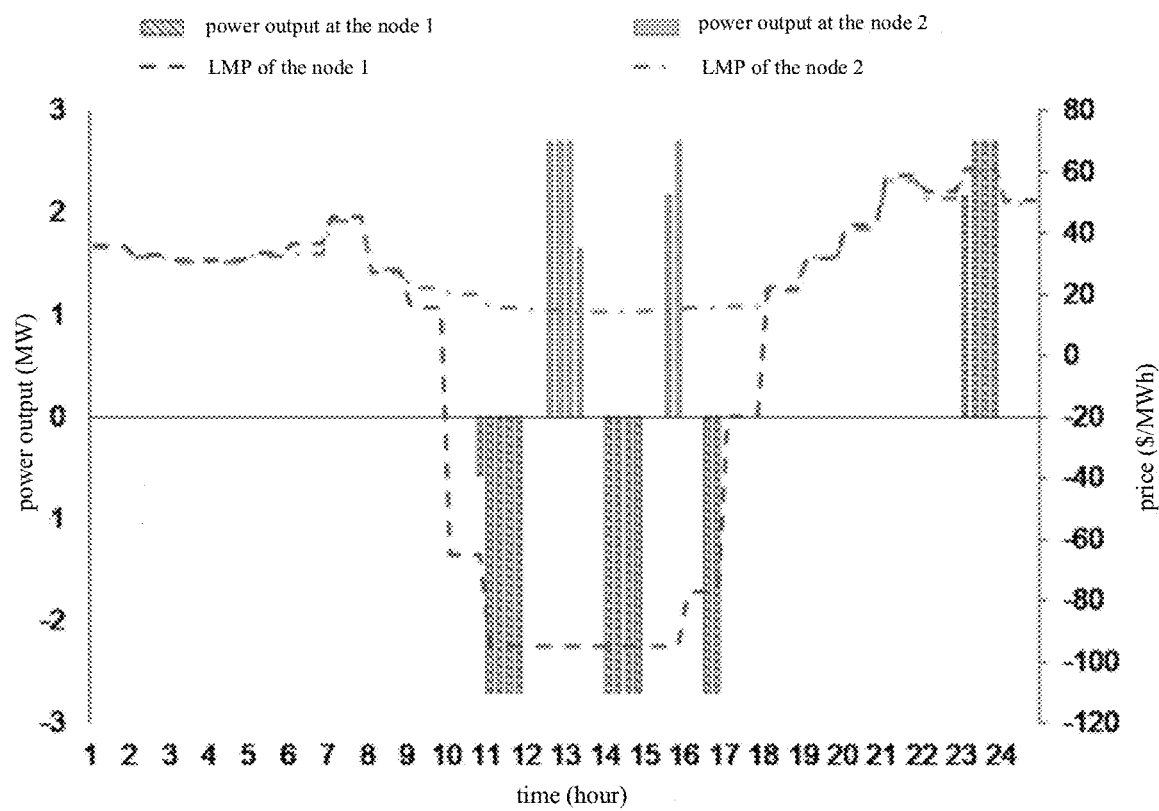
FIG. 3 illustrates an operation scheme where the PESS performs operations among the set of sample nodes as illustrated in FIG. 2 in a day.

FIG. 3 illustrates an optimal operation scheme of the PESS between the two nodes shown in FIG. 2 and the LMP benefits in a day. The broken line represents the LMP of the two nodes. From 10 am to 5 pm, there is a noticeable price difference that indicates the congestion between the two nodes, in which the node 2 is a high price node and the node 1 is a low price node. Although the true reason of the congestion is unknown, it is reasonable to deduce there is too much solar power at the node 1 based on the price benefit. To take advantage of such price difference, the PESS moves between the two nodes to discharge or sell energy at the node 2 (illustrated as bars with horizontal lines) and to store or purchase energy at the node 1 (illustrated as bars with diagonal lines). In FIG. 3, each time the bar changes, PESS completes the travel from one node to another. It may be seen that the PESS completes two round trips in one day. Compared with the fixed storage device, the travel capability provides the PESS with more benefit opportunities since the PESS may benefit from the price difference between different nodes and from the price difference of the same node at different times, while the fixed storage device may only benefit from the price difference of the same node. As illustrated in FIG. 3, the PESS performs three benefit cycles in a day (e.g., about 11:00-13:00, about 14:00-16:00, about 17:00-23:00 in FIG. 3), while the fixed device may only perform one benefit cycle during a peak time to a trough time (e.g., about 17:00-23:00 at the node 2 in FIG. 3). The congestion between two nodes may be alleviated since the PESS may bring more than 3 MWh of energy from the node 1 to the node 2 in a day.

Figure 4:
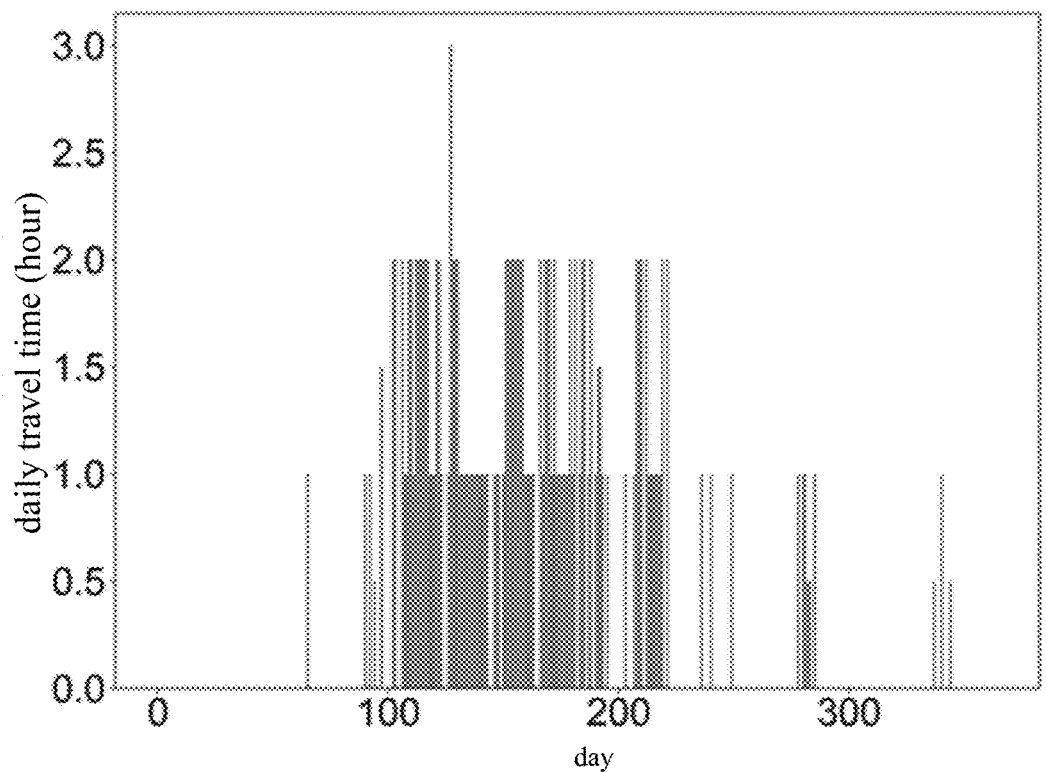
FIG. 4 illustrates a schematic diagram of the daily travel time of the PESS between the set of sample nodes as illustrated in FIG. 2 in a year.

FIG. 4 illustrates daily travel time of the PESS in a year. The total travel time in a year is calculated to be 153 hours, then the average daily travel time of the PESS may be approximately 0.4 hours per day. This result indicates there are intensive travels over a period of time. In those days when there is no significant price difference between the two nodes, PESS may serve to the clogged node pairs in adjacent regions.

The method of the present disclosure may also be applied to other applications, for example, an application with multiple benefit streams.

According to the method for controlling a PESS in the embodiments of the present disclosure, the decision optimization model related to at least one of the energy charging and discharging decision, the travel decision and the energy storage unit loading decision of the PESS is created and solved, the feasible solution is thus obtained that may meet the goal of maximizing the available compensation of the PESS, at least one of the energy charging and discharging decision, the travel decision and the energy storage unit loading decision of the PESS is determined based on the feasible solution, and the operations of the PESS are controlled based on the determined decision, which may realize the maximized available benefit of the PESS.

The method for controlling a PESS according to the disclosure may maximize the benefits of the PESS subject to aging and other operation constraints. The benefit in each cycle includes the power market benefit, which may be a function of the market price and the power output of the PESS. The PESS is not a price taker who has no influence on the market price, but may bid on the market to maximize its short-term benefits. In addition, the benefit in each cycle of the PESS may come from multiple streams, for example, when the PESS provides multiple services. The benefit in each cycle of the PESS may include savings in emission costs, or may include s sum of all fixed costs, such as taxes, usage and maintenance costs, and so on. In addition, the benefit in each cycle may also include benefit obtained from the used batteries collected by the vehicle body. In addition, the benefit in each cycle may also include the benefit obtained from selling all or part of the energy storage device in the PESS, which may be a function of the state of charge and the state of health of the energy storage unit to be sold. In addition, the benefit in each cycle may also include benefit from leasing or sharing all or part of the energy storage device in the PESS, which may be a function of the state of charge, the state of health of the energy storage unit to be leased or shared, and the usage of energy storage devices during the return period.

The energy capacity, power capacity and efficiency of the PESS decrease with the cumulative use of the PESS.

In addition, the functional loss of the energy storage units in the PESS may be restored through component replacement or repair. However, the component replacement or repair will incur additional replacement or repair costs.

The available information about the market benefit rate is scattered, and the PESS needs to iteratively communicate with local connection agents to obtain the information required for operation decisions.

The power and energy capacity, the efficiency, the aging loss and the constraints of the PESS dynamically depend on the energy storage unit loading decision.

The methods disclosed herein may be conveniently implemented in one or more machines, central computers or distributed computers. According to the description in the present disclosure, those skilled in the art can easily complete software codes. The software may be used to manage a single PESS or a group of PESSs, where the group of PESSs may be individually controlled. Such software may be combined with any market forecasting method or any machine learning technology that provides necessary inputs to approximate or estimate the optimal operation strategy of the PESS.

Figure 5:
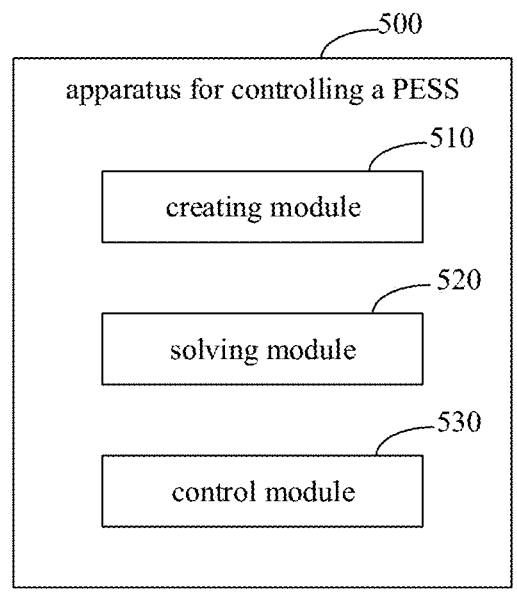
FIG. 5 illustrates a structural schematic diagram of an apparatus for controlling a PESS according to an embodiment of the present disclosure.

The embodiments of the present disclosure also provide an apparatus for controlling a PESS. As illustrated in FIG. 5, the apparatus 500 for controlling a PESS includes a creating module 501, a solving module 502 and a control module 503.

The creating module 501 is configured to create a decision optimization model for the PESS. The decision optimization model is related to at least one of an energy charging and discharging decision, a travel decision, and an energy storage unit loading decision of the PESS in a region to be applied and includes an objective function aiming at maximizing available compensation of the PESS in the region to be applied.

The solving module 502 is configured to solve the decision optimization model to obtain a feasible solution that meets the objective function.

The control module 503 is configured to determine at least one of the energy charging and discharging decision, the travel decision, and the energy storage unit loading decision of the PESS in the region to be applied based on the feasible solution, and control operations of the PESS in the region to be applied based on at least one of the determined energy charging and discharging decision, the determined travel decision and the determined energy storage unit loading decision.

In some embodiments, the objective function depends on compensation related to energy charging and discharging and obtained by the PESS in the region to be applied through charging and discharging energies, a transportation loss caused when the PESS is operated to move between different nodes in the region to be applied, and an aging loss caused by the energy use of the PESS.

In some embodiments, the decision optimization model further includes energy constraints for an energy capacity of the PESS, power output constraints for a power capacity of the PESS, and travel time constraints for an operation time of the PESS.

In some embodiments, the objective function is expressed as:

$$\max_{P^{dis}_{n,h}, P^{cha}_{n,h}, \gamma_{n,n',h}} Y_t = \max_{P^{dis}_{n,h}, P^{cha}_{n,h}, \gamma_{n,n',h}} R_t - C_t^{tr} - C_t^d$$

where n and n' represent a node index, h represents a time index, $Y_t$ represents available compensation of the PESS in the region to be applied, $R_t$ represents compensation related to the energy charging and discharging, $C_t^{tr}$ represents transportation loss, $C_t^d$ represents aging loss, $P_{n,h}^{dis}$ represents the energy discharging of the PESS at the node n and the time h, $P_{n,h}^{cha}$ represents the energy charging of the PESS at the node n and the time h, and $\gamma_{n,n',h}$ represents whether the PESS moves from the node n to the node n' at the time h.

In some embodiments, the compensation related to the energy charging and discharging is determined by:

$$R_t = \sum_{h \in [t, t+\Delta t]} \sum_{n \in \Omega_n} \left[ \lambda_{n,h} \left( P_{n,h}^{dis} - P_{n,h}^{cha} \right) \Delta h \right]$$

where $\Delta h$ represents a dispatch time scale, t represents a date index, $\Delta t$ represents a decision application duration, $\lambda_{n,h}$ represents a locational marginal price at the node n and the time h, and $\Omega_n$ represents a set of nodes to which the PESS will be shared.

In some embodiments, the transportation loss is determined by:

$$C_t^{tr} = c_{tr} \sum_{h \in [t, t+\Delta t]} \gamma_{n,n',h} \Delta h$$

where $\Delta h$ represents a dispatch time scale, t represents a date index, $\Delta t$ represents a decision application duration, and $c_{tr}$ represents a transportation loss per unit time.

In some embodiments, the transportation loss is determined by:

$$C_t^d = c_t^d \left[ \sum_{h \in [t, t+\Delta t]} \left(P_{n,h}^{dis} + P_{n,h}^{cha}\right) \Delta h + q_t \right]$$

where $\Delta h$ represents a dispatch time scale, t represents a date index, $\Delta t$ represents a decision application duration, $c_t^d$ represents an aging loss per unit time, and $q_t$ represents calendar aging at the time t.

In some embodiments, the energy constraints are expressed as:

$$E_h = (1-\rho)E_{h-1} + \sum_{n \in \Omega_n} \left(P_{n,h}^{cha} \eta_t \Delta h - P_{n,h}^{dis} \Delta h / \eta_t\right) \ \forall h \in [t, t+\Delta t]$$

$$0 \le E_h \le E_t^{max} \ \forall h \in [t, t+\Delta t]$$

where n represents a node index, h represents a time index, $\Delta h$ represents a dispatch time scale, t represents a date index, $\Delta t$ represents a decision application duration, $P_{n,h}^{dis}$ represents the energy discharging of the PESS at the node n and the time h, $P_{n,h}^{cha}$ represents the energy charging of the PESS at the node n and the time h, $\eta_t$ represents the energy charging and discharging efficiency of the PESS at t, $\rho$ represents a self-discharge rate of the PESS, $E_h$ represents an energy level of the PESS at the time h, $E_{h-1}$ represents an energy level of the PESS at the time h−1, and $E_t^{max}$ represents an energy capacity of the PESS.

In some embodiments, the power output constraints are expressed as:

$$0 \le P_{n,h}^{dis}, P_{n,h}^{cha} \le \omega_{n,h} P_t^{max} \ \forall n \in \Omega_n, h \in [t, t+\Delta t]$$

$$\sum_{n \in \Omega_n} \omega_{n,h} \le 1 - \sum_{n \in \Omega_n} \sum_{n' \in \Omega_n} \gamma_{n,n',h} \ \forall h \in [t, t+\Delta t]$$

$$\alpha_{n,h} - \beta_{n,h} = \omega_{n,h} - \omega_{n,h-1} \ \forall n \in \Omega_n, h \in [t, t+\Delta t]$$

$$\sum_{n \in \Omega_n} (\alpha_{n,h} + \beta_{n,h}) \le 1 \ \forall h \in [t, t+\Delta t]$$

$$\sum_{n' \in \Omega_n} \gamma_{n,n',h} \ge \beta_{n,h} \ \forall n \in \Omega_n, h \in [t, t+\Delta t]$$

$$\alpha_{n',h} - \theta_{n',h} = \sum_{n \in \Omega_n} \left(\gamma_{n,n',h-1} - \gamma_{n,n',h}\right) \ \forall n' \in \Omega_n, h \in [t, t+\Delta t]$$

$$\sum_{n \in \Omega_n} (\alpha_{n,h} + \theta_{n,h}) \le 1 \ \forall h \in [t, t+\Delta t]$$

where n represents a node index, h represents a time index, t represents a date index, $\Delta t$ represents a decision application duration, $\Omega_n$ represents a set of nodes that the PESS will be shared, $P_{n,h}^{dis}$ represents the energy discharging of the PESS at the node n and the time h, $P_{n,h}^{cha}$ represents the energy charging of the PESS at the node n and the time h, $\omega_{n,h}$ represents whether the PESS is located in the node n at the time h, $P_t^{max}$ represents a power capacity of the PESS, $\gamma_{n,n',h}$ represents whether the PESS moves from the node n to the node n' at the time h, $\alpha_{n,h}$ represents whether the PESS moves to the node n at the time h, $\beta_{n,h}$ represents whether the PESS moves away from the node n at the time h, $\omega_{n,h-1}$ represents whether the PESS is located in the node n at the time h−1, $\alpha_{n',h}$ represents whether the PESS moves to the node n' at the time h, $\gamma_{n,n',h-1}$ represents whether the PESS moves from the node n to the node n' at the time h−1, $\theta_{n,h}$ and $\theta_{n',h}$ represent auxiliary variables. The auxiliary variables may be pre-determined, and different values may be taken at different nodes and for different times.

In some embodiments, the travel time constraints are expressed as:

$$\gamma_{n,n',h} \ge \gamma_{n,n',h-1} - \gamma_{n,n',h-T_{n,n',h}} \ \forall n \in \Omega_n, n' \in \Omega_n, h \in [t, t+\Delta t]$$

where n and n' represents a node index, h represents a time index, t represents a date index, $\Delta t$ represents a decision application duration, $\Omega_n$ represents a set of nodes that the PESS will be shared, $\gamma_{n,n',h}$ represents whether the PESS is moved from the node n to the node n' at the time h, and $\gamma_{n,n',h-1}$ represents whether the PESS is moved from the node n to the node n' at the time h−1, and $T_{n,n',h}$ represents a duration required by the PESS ready to operate away from the node n to the node n' at the time h. Specifically, $T_{n,n',h}$ may be a total time required when the PESS stops charging and discharging from the node n, is ready to leave and moves to the node n' being ready to start charging and discharging, which includes a transportation time, a time for the PESS plug-in and deployment, etc.

The embodiment of the present disclosure also provides a device for controlling a PESS, which includes a processor and a memory configured to store instructions executable by the processor. When the instructions are executed by the processor, the processor is caused to implement the method for controlling a PESS according to the foregoing embodiments of the present disclosure.

The embodiment of the present disclosure also provides a computer-readable storage medium having computer programs stored thereon. When the computer program in the storage medium are executed by the computer, the computer is caused to implement the method for controlling a PESS according to the foregoing embodiments of the present disclosure.

The embodiment of the present disclosure also provides a computer program product including instructions. When the instructions are running on a computer, the computer is caused to implement the method for controlling a PESS according to the foregoing embodiments of the present disclosure.

In the several embodiments according to the application, it should be understood that the disclosed apparatus may be implemented in other ways. For example, the apparatus embodiments described above are merely exemplary. For example, the division of the units is only a logical function division, and there may be other divisions in actual implementation, for example, multiple units or components may be combined or may be integrated into another system, or some features may be ignored or not implemented. In addition, the displayed or discussed mutual coupling or direct coupling or communication connection may be indirect coupling or communication connection through some interfaces, apparatuses or units, which may be in electrical or other forms.

The units described as separate components may or may not be physically separated, and the components displayed as units may or may not be physical units, that is, they may be located in one place, or they may be distributed on multiple network units. Some or all of the units may be selected according to actual requirements to achieve the objectives of the solutions of the embodiments.

In addition, various functional units in the various embodiments of the present application may be integrated into one processing unit, or various units may exist alone physically, or two or more units may be integrated into one unit. The integrated unit may be implemented in hardware or in a form of a software functional unit.

If the integrated unit is implemented in the form of the software functional unit and sold or used as an independent product, it may be stored in a computer readable memory. Based on such understanding, the part that contributes to the related art in the technical solution of the present application essentially or all or part of the technical solution may be embodied in the form of a software product, and the computer software product is stored in a memory, which includes several instructions to enable a computer device (which may be a personal computer, a server, or a network device, etc.) to execute all or part of the steps of the foregoing methods in the various embodiments of the present application. The aforementioned memory includes: a U disk, a read-only memory (ROM), a random access memory (RAM), a mobile hard disk, a magnetic disk, or an optical disk and other media that can store program codes.

Those skilled in the art may understand that all or part of the steps in the various methods of the above-mentioned embodiments may be completed by programs instructing relevant hardware. The programs may be stored in a computer-readable memory which may include: a flash disk, a read-only memory (abbreviated as ROM), a random access memory (abbreviated as RAM), a magnetic disk or a CD-ROM, etc.

The embodiments of the application are described in detail above, and specific examples are used in this article to illustrate the principles and implementation of the application. The descriptions of the above examples are only used to help understand the methods and core concept of the application; at the same time, those skilled in the art will make changes to the specific implementation and the scope of application based on the concept of the present application. In summary, the content of the specification should not be construed as limiting the application.

Those skilled in the art should easily realize that in combination with the units and algorithm steps of the examples described in the embodiments disclosed herein, the present invention may be implemented in the form of hardware or a combination of hardware and computer software. Whether a certain function is executed by hardware or in a way of the computer software driving the hardware depends on the specific application and design constraint conditions of the technical solution. Professionals and technicians may use different methods for each specific application to implement the described functions, but such implementation should not be considered as going beyond the scope of the present invention.

What is claimed is:

1. A method for controlling a portable energy storage system (PESS), comprising:
  creating a decision optimization model for the PESS, in which the decision optimization model is related to at least one of an energy charging and discharging decision, a travel decision, and an energy storage unit loading decision of the PESS in a region to be applied, and the decision optimization model includes an objective function for maximizing available compensation of the PESS in the region to be applied;
  solving the decision optimization model to obtain a feasible solution that meets the objective function; and
  determining at least one of the energy charging and discharging decision, the travel decision, and the energy storage unit loading decision of the PESS in the region to be applied based on the feasible solution, and controlling operations of the PESS in the region to be applied based on at least one of the determined energy charging and discharging decision, the determined travel decision and the determined energy storage unit loading decision;
  wherein the objective function is determined based on a total compensation obtained by the PESS in the region to be applied charging and discharging energy, a transportation loss caused when the PESS is operated to move between different nodes in the region to be applied, and an aging loss caused by energy use of the PESS;
  wherein the objective function is expressed as:

$$\max_{P_{n,h}^{dis}, P_{n,h}^{cha}, \gamma_{n,n',h}} Y_t = \max_{P_{n,h}^{dis}, P_{n,h}^{cha}, \gamma_{n,n',h}} (R_t - C_t^{tr} - C_t^{d})$$

where n and n' represent a node index, h represents a time index, $Y_t$ represents available compensation of the PESS in the region to be applied, $R_t$ represents the total compensation, $C_t^{tr}$ represents the transportation loss, $C_t^{d}$ represents the aging loss, $P_{n,h}^{dis}$ represents the energy discharging of the PESS at the node n and the time h, $P_{n,h}^{cha}$ represents the energy charging of the PESS at the node n and the time h, and $\gamma_{n,n',h}$ represents whether the PESS moves from the node n to the node n' at the time h.

2. The method of claim 1, wherein the decision optimization model further comprises energy constraints for an energy capacity of the PESS, power output constraints for a power capacity of the PESS, and travel time constraints for an operation time of the PESS.

3. The method of claim 1, wherein the total compensation is determined by an equation of:

$$R_t = \sum_{h \in [t, t+\Delta t]} \sum_{n \in \Omega_n} \left[ \lambda_{n,h} (P_{n,h}^{dis} - P_{n,h}^{cha}) \Delta h \right]$$

where $\Delta h$ represents a dispatch time scale, t represents a date index, $\Delta t$ represents a decision application duration, $\lambda_{n,h}$ represents a locational marginal price at the node n and the time h, and $\Omega_n$ represents a set of nodes to which the PESS will be shared.

4. The method of claim 1, wherein the transportation loss is determined by an equation of:

$$C_t^{tr} = c_{tr} \sum_{h \in [t, t+\Delta t]} \gamma_{n,n',h} \Delta h$$

where $\Delta h$ represents a dispatch time scale, t represents a date index, $\Delta t$ represents a decision application duration, and $c_{tr}$ represents a transportation loss per unit time.

5. The method of claim 1, wherein the aging loss is determined by an equation of:

$$C_t^{d} = c_t^{d} \left[ \sum_{h \in [t, t+\Delta t]} (P_{n,h}^{dis} + P_{n,h}^{cha}) \Delta h + q_t \right]$$

where $\Delta h$ represents a dispatch time scale, t represents a date index, $\Delta t$ represents a decision application duration, $c_t^d$ represents an aging loss per unit time, and $q_t$ represents a calendar aging loss at the time t.

6. The method of claim 2, wherein the enemy constraints are expressed as:

$$E_h = (1-\rho)E_{h-1} + \sum_{n \in \Omega_n} \left(P_{n,h}^{cha}\eta_t \Delta h - P_{n,h}^{dis}\Delta h/\eta_t\right) \forall h \in [t, t+\Delta t]$$

$$0 \le E_h \le E_t^{max} \forall h \in [t, t+\Delta t]$$

where n represents a node index, h represents a time index, Δh represents a dispatch time scale, t represents a date index, Δt represents a decision application duration, $P_{n,h}^{dis}$ represents the energy discharging of the PESS at the node n and the time h, $P_{n,h}^{cha}$ represents the energy charging of the PESS at the node n and the time h, $\eta_t$ represents the energy charging and discharging efficiency of the PESS at t, ρ represents a self-discharge rate of the PESS, $E_h$ represents an energy level of the PESS at the time h, $E_{h-1}$ represents an energy level of the PESS at the time h−1, and $E_t^{max}$ represents an energy capacity of the PESS.

7. The method of claim 2, wherein the power output constraints are expressed as:

$$0 \le P_{n,h}^{dis}, P_{n,h}^{cha} \le \omega_{n,h}P_t^{max} \forall n \in \Omega_n, h \in [t, t+\Delta t]$$

$$\sum_{n \in \Omega_n} \omega_{n,h} \le 1 - \sum_{n \in \Omega_n}\sum_{n' \in \Omega_n} \gamma_{n,n',h} \forall h \in [t, t+\Delta t]$$

$$\alpha_{n,h} - \beta_{n,h} = \omega_{n,h} - \omega_{n,h-1} \forall n \in \Omega_n, h \in [t, t+\Delta t]$$

$$\sum_{n \in \Omega_n} (\alpha_{n,h} + \beta_{n,h}) \le 1 \forall h \in [t, t+\Delta t]$$

$$\sum_{n' \in \Omega_n} \gamma_{n,n',h} \ge \beta_{n,h} \forall n \in \Omega_n, h \in [t, t+\Delta t]$$

$$\alpha_{n',h} - \theta_{n',h} = \sum_{n \in \Omega_n} \left(\gamma_{n,n',h-1} - \gamma_{n,n',h}\right) \forall n' \in \Omega_n, h \in [t, t+\Delta t]$$

$$\sum_{n \in \Omega_n} (\alpha_{n,h} + \theta_{n,h}) \le 1 \forall h \in [t, t+\Delta t]$$

where n represents a node index, h represents a time index, t represents a date index, Δt represents a decision application duration, $\Omega_n$ represents a set of nodes that the PESS will be shared, $P_{n,h}^{dis}$ represents the energy discharging of the PESS at the node n and the time h, $P_{n,h}^{cha}$ represents the energy charging of the PESS at the node n and the time h, $\omega_{n,h}$ represents whether the PESS is located in the node n at the time h, $P_t^{max}$ represents a power capacity of the PESS, $\gamma_{n,n',h}$ represents whether the PESS moves from the node n to the node n' at the time h, $\alpha_{n,h}$ represents whether the PESS moves to the node n at the time h, $\beta_{n,h-1}$ represents whether the PESS moves away from the node n at the time h, $\omega_{n,h-1}$ represents whether the PESS is located in the node n at the time h−1, $\alpha_{n',h}$ represents whether the PESS moves to the node n' at the time h, $\gamma_{n,n',h-1}$ represents whether the PESS moves from the node n to the node n' at the time h−1, $\theta_{n,h}$ and $\theta_{n',h}$ represent auxiliary variables.

8. The method of claim 2, wherein the travel time constraints are expressed as:

$$\gamma_{n,n',h} \ge \gamma_{n,n',h-1} - \gamma_{n,n',h-T_{n,n',h}} \forall n \in \Omega_n, n' \in \Omega_n, h \in [t, t+\Delta t]$$

where n and n' represents a node index, h represents a time index, t represents a date index, Δt represents a decision application duration, $\Omega_n$ represents a set of nodes that the PESS will be shared, $\gamma_{n,n',h}$ represents whether the PESS is moved from the node n to the node n' at the time h, and $\gamma_{n,n',h-1}$ represents whether the PESS is moved from the node n to the node n' at the time h−1, and $T_{n,n',h}$ represents a duration required by the PESS ready to operate away from the node n to the node n' at the time h.

9. The method of claim 1, wherein the PESS comprises a vehicle body and an energy storage device carried by the vehicle body, and the vehicle body is configured to move between the different nodes in the region to be applied to perform at least one of the determined energy charging and discharging decision, the determined travel decision, and the determined energy storage unit loading decision using the energy storage device.

10. A device for controlling a portable energy storage system (PESS), comprising:
a processor; and
a memory configured to store instructions executable by the processor;
wherein when the instructions are executed by the processor, the processor is caused to implement a method for controlling a PESS, the method comprises:
creating a decision optimization model for the PESS, in which the decision optimization model is related to at least one of an energy charging and discharging decision, a travel decision, and an energy storage unit loading decision of the PESS in a region to be applied, and the decision optimization model includes an objective function for maximizing available compensation of the PESS in the region to be applied;
solving the decision optimization model to obtain a feasible solution that meets the objective function; and
determining at least one of the energy charging and discharging decision, the travel decision, and the energy storage unit loading decision of the PESS in the region to be applied based on the feasible solution, and controlling operations of the PESS in the region to be applied based on at least one of the determined energy charging and discharging decision, the determined travel decision and the determined energy storage unit loading decisions;
wherein the objective function is determined based on a total compensation obtained by the PESS in the region to be applied charging and discharging energy, a transportation loss caused when the PESS is operated to move between different nodes in the region to be applied, and an aging loss caused by energy use of the PESS;
wherein the objective function is expressed as:

$$\max_{P_{n,h}^{dis},P_{n,h}^{cha},\gamma_{n,n',h}} Y_t = \max_{P_{n,h}^{dis},P_{n,h}^{cha},\gamma_{n,n',h}} \left(R_t - C_t^{tr} - C_t^d\right)$$

where n and n' represent a node index, h represents a time index, $Y_t$ represents available compensation of the PESS in the region to be applied, $R_t$ represents the total compensation, $C_t^{tr}$ represents the transportation loss, $C_t^d$ represents the aging loss, $P_{n,h}^{dis}$ represents the energy discharging of the PESS at the node n and the time h, $P_{n,h}^{cha}$ represents the energy charging of the PESS at the node n and the time h, and $\gamma_{n,n',h}$ represents whether the PESS moves from the node n to the node n' at the time h.

11. The device of claim 10, wherein the decision optimization model further comprises energy constraints for an energy capacity of the PESS, power output constraints for a power capacity of the PESS, and travel time constraints for an operation time of the PESS.

12. The device of claim 10, wherein the total compensation is determined by an equation of:

$$R_t = \sum_{h \in [t, t+\Delta t]} \sum_{n \in \Omega_n} \left[ \lambda_{n,h} \left( P_{n,h}^{dis} - P_{n,h}^{cha} \right) \Delta h \right]$$

where $\Delta h$ represents a dispatch time scale, t represents a date index, $\Delta t$ represents a decision application duration, $\lambda_{n,h}$ represents a locational marginal price at the node n and the time h, and $\Omega_n$ represents a set of nodes to which the PESS will be shared.

13. The device of claim 10, wherein the transportation loss is determined by an equation of:

$$C_t^{tr} = c_{tr} \sum_{h \in [t, t+\Delta t]} \gamma_{n,n',h} \Delta h$$

where $\Delta h$ represents a dispatch time scale, t represents a date index, $\Delta t$ represents a decision application duration, and $c_{tr}$ represents a transportation loss per unit time.

14. The device of claim 10, wherein the aging loss is determined by an equation of:

$$C_t^d = c_t^d \left[ \sum_{h \in [t, t+\Delta t]} \left( P_{n,h}^{dis} + P_{n,h}^{cha} \right) \Delta h + q_t \right]$$

where $\Delta h$ represents a dispatch time scale, t represents a date index, $\Delta t$ represents a decision application duration, $c_t^d$ represents an aging loss per unit time, and $q_t$ represents a calendar aging loss at the time t.

15. The device of claim 11, wherein the energy constraints are expressed as:

$$E_h = (1-\rho)E_{h-1} + \sum_{n \in \Omega_n} \left( P_{n,h}^{cha} \eta_t \Delta h - P_{n,h}^{dis} \Delta h / \eta_t \right) \ \forall \, h \in [t, t+\Delta t]$$

$$0 \leq E_h \leq E_t^{max} \ \forall \, h \in [t, t+\Delta t]$$

where n represents a node index, h represents a time index, $\Delta h$ represents a dispatch time scale, t represents a date index, $\Delta t$ represents a decision application duration, $P_{n,h}^{dis}$ represents the energy discharging of the PESS at the node n and the time h, $P_{n,h}^{cha}$ represents the energy charging of the PESS at the node n and the time h, $\eta_t$ represents the energy charging and discharging efficiency of the PESS at t, $\rho$ represents a self-discharge rate of the PESS, $E_h$ represents an energy level of the PESS at the time h, $E_{h-1}$ represents an energy level of the PESS at the time h−1, and $E_t^{max}$ represents an energy capacity of the PESS.

16. The device of claim 11, wherein the power output constraints are expressed as:

$$0 \leq P_{n,h}^{dis}, P_{n,h}^{cha} \leq \omega_{n,h} P_t^{max} \ \forall \, n \in \Omega_n, h \in [t, t+\Delta t]$$

$$\sum_{n \in \Omega_n} \omega_{n,h} \leq 1 - \sum_{n \in \Omega_n} \sum_{n' \in \Omega_n} \gamma_{n,n',h} \ \forall \, h \in [t, t+\Delta t]$$

$$\alpha_{n,h} - \beta_{n,h} = \omega_{n,h} - \omega_{n,h-1} \ \forall \, n \in \Omega_n, h \in [t, t+\Delta t]$$

$$\sum_{n \in \Omega_n} (\alpha_{n,h} + \beta_{n,h}) \leq 1 \ \forall \, h \in [t, t+\Delta t]$$

$$\sum_{n' \in \Omega_n} \gamma_{n,n',h} \geq \beta_{n,h} \ \forall \, n \in \Omega_n, h \in [t, t+\Delta t]$$

$$\alpha_{n',h} - \theta_{n',h} = \sum_{n \in \Omega_n} (\gamma_{n,n',h-1} - \gamma_{n,n',h}) \ \forall \, n' \in \Omega_n, h \in [t, t+\Delta t]$$

$$\sum_{n \in \Omega_n} (\alpha_{n,h} + \theta_{n,h}) \leq 1 \ \forall \, h \in [t, t+\Delta t]$$

where n represents a node index, h represents a time index, t represents a date index, $\Delta t$ represents a decision application duration, $\Omega_n$ represents a set of nodes that the PESS will be shared, $P_{n,h}^{dis}$ represents the energy discharging of the PESS at the node n and the time h, $P_{n,h}^{cha}$ represents the energy charging of the PESS at the node n and the time h, $\omega_{n,h}$ represents whether the PESS is located in the node n at the time h, $P_t^{max}$ represents a power capacity of the PESS, $\gamma_{n,n',h}$ represents whether the PESS moves from the node n to the node n' at the time h, $\alpha_{n,h}$ represents whether the PESS moves to the node n at the time h, $\beta_{n,h}$ represents whether the PESS moves away from the node n at the time h, $\omega_{n,h-1}$ represents whether the PESS is located in the node n at the time h−1, $\alpha_{n',h}$ represents whether the PESS moves to the node n' at the time h, $\gamma_{n,n',h-1}$ represents whether the PESS moves from the node n to the node n' at the time h−1, $\theta_{n,h}$ and $\theta_{n,h}$ represent auxiliary variables.

17. The device of claim 11, wherein the travel time constraints are expressed as:

$$\gamma_{n,n',h} \geq \gamma_{n,n',h-1} - \gamma_{n,n',h-T_{n,n',h}} \forall n \in \Omega_n, n' \in \Omega_n, h \in [t,t+\Delta t]$$

where n and n' represents a node index, h represents a time index, t represents a date index, $\Delta t$ represents a decision application duration, $\Omega_n$ represents a set of nodes that the PESS will be shared, $\gamma_{n,n',h}$ represents whether the PESS is moved from the node n to the node n' at the time h, and $\gamma_{n,n',h-1}$ represents whether the PESS is moved from the node n to the node n' at the time h−1, and $T_{n,n',h}$ represents a duration required by the PESS ready to operate away from the node n to the node n' at the time h 0.20.

18. The device of claim 10, wherein the PESS comprises a vehicle body and an energy storage device carried by the vehicle body, and the vehicle body is configured to move between the different nodes in the region to be applied to perform at least one of the determined energy charging and discharging decision, the determined travel decision, and the determined energy storage unit loading decision using the energy storage device.

19. A non-transitory computer readable storage medium having computer programs stored thereon, wherein when the computer programs are executed by a computer, a method for controlling a portable energy storage system (PESS) is implemented, the method comprising:

creating a decision optimization model for the PESS, in which the decision optimization model is related to at least one of an energy charging and discharging decision, a travel decision, and an energy storage unit loading decision of the PESS in a region to be applied, and the decision optimization model includes an objective function for maximizing available compensation of the PESS in the region to be applied;

solving the decision optimization model to obtain a feasible solution that meets the objective function; and determining at least one of the energy charging and discharging decision, the travel decision, and the energy storage unit loading decision of the PESS in the region to be applied based on the feasible solution, and controlling operations of the PESS in the region to be applied based on at least one of the determined energy charging and discharging decision, the determined travel decision and the determined energy storage unit loading decision;

wherein the objective function is determined based on a total compensation obtained by the PESS in the region to be applied charging and discharging energy, a transportation loss caused when the PESS is operated to move between different nodes in the region to be applied, and an aging loss caused by energy use of the PESS;

wherein the objective function is expressed as:

$$\max_{P^{dis}_{n,h}, P^{cha}_{n,h}, \gamma_{n,n',h}} Y_t = \max_{P^{dis}_{n,h}, P^{cha}_{n,h}, \gamma_{n,n',h}} (R_t - C_t^{tr} - C_t^d)$$

where n and n' represent a node index, h represents a time index, $Y_t$ represents available compensation of the PESS in the region to be applied, $R_t$ represents the total compensation, $C_t^{tr}$ represents the transportation loss, $C_t^d$ represents the aging loss, $P_{n,h}^{dis}$ represents the energy discharging of the PESS at the node n and the time h, $P_{n,h}^{cha}$ represents the energy charging of the PESS at the node n and the time h, and $\gamma_{n,n'nh}$ represents whether the PESS moves from the node n to the node n' at the time h.

20. The non-transitory computer readable storage medium of claim 19, wherein the PESS comprises a vehicle body and an energy storage device carried by the vehicle body, and the vehicle body is configured to move between the different nodes in the region to be applied to perform at least one of the determined energy charging and discharging decision, the determined travel decision, and the determined energy storage unit loading decision using the energy storage device.

* * * * *